US007484023B2

United States Patent
Meaney et al.

(10) Patent No.: US 7,484,023 B2
(45) Date of Patent: Jan. 27, 2009

(54) COMPUTER SYSTEM APPARATUS FOR STABILIZING ASYNCHRONOUS INTERFACES

(75) Inventors: Patrick J. Meaney, Poughkeepsie, NY (US); Anthony P. Cullen, Ringwood, NJ (US); Michael Fee, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 11/532,199

(22) Filed: Sep. 15, 2006

(65) Prior Publication Data

US 2008/0071952 A1    Mar. 20, 2008

(51) Int. Cl.
G06F 13/42    (2006.01)
H03K 19/00    (2006.01)
G06F 13/14    (2006.01)

(52) U.S. Cl. .................. 710/105; 710/58; 710/305; 326/94

(58) Field of Classification Search .......... 710/105
See application file for complete search history.

(56) References Cited

U.S. PATENT DOCUMENTS

| | | | | |
|---|---|---|---|---|
| 5,592,509 A * | 1/1997 | McClear et al. | .......... | 375/219 |
| 5,715,405 A * | 2/1998 | McClear et al. | .......... | 710/100 |
| 5,867,731 A * | 2/1999 | Williams et al. | .......... | 710/29 |
| 7,003,605 B2 * | 2/2006 | Craft et al. | .......... | 710/106 |
| 7,082,484 B2 * | 7/2006 | Cranford et al. | .......... | 710/106 |
| 7,142,621 B2 * | 11/2006 | Vallet et al. | .......... | 375/355 |
| 7,180,966 B2 * | 2/2007 | Vallet et al. | .......... | 375/340 |
| 7,248,696 B2 * | 7/2007 | Craft et al. | .......... | 380/263 |
| 2003/0086517 A1 * | 5/2003 | Vallet et al. | .......... | 375/355 |
| 2003/0091137 A1 * | 5/2003 | Vallet et al. | .......... | 375/360 |
| 2003/0095619 A1 * | 5/2003 | Vallet et al. | .......... | 375/355 |
| 2004/0054830 A1 * | 3/2004 | Craft et al. | .......... | 710/107 |

\* cited by examiner

Primary Examiner—Paul R. Myers
Assistant Examiner—Ryan M Stiglic
(74) Attorney, Agent, or Firm—Lynn L. Augspurger

(57) ABSTRACT

A computer system apparatus for asynchronous data transfer between a source and sink without the use of an asynchronous control signal. includes metastability circuits, data change detection logic, a stability window delay counter, and a mux/register pair to allow for the holding of previous stable data during the transition. While the processing logic employed specifically applies to asynchronous logic, the logic can be extended to synchronous or untimed interfaces as well. Also disclosed is a programmable means to adjust the window delay.

7 Claims, 5 Drawing Sheets

TIME

| Data Input Bus | Output Bus No invention | Output Bus Invention |
|---|---|---|
| 00000 | 00000 | 00000 |
| 00000 | 00000 | 00000 |
| 0FF00 | 0A000 | 00000 |
| 0FF00 | 0E800 | 00000 |
| 0FF00 | 0FF00 | 0FF00 |
| 0FF00 | 0FF00 | 0FF00 |
| 000FF | 00331 | 0FF00 |
| 000FF | 001FA | 0FF00 |
| 000FF | 000FF | 000FF |
| 000FF | 000FF | 000FF |
| 000FF | 000FF | 000FF |

COMPUTER SYSTEM APPARATUS FOR STABILIZING ASYNCHRONOUS INTERFACES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a transfer of data, and particularly to a method of stabilizing one or more bus signals across an asynchronous or untimed interface without the use of a separate control signal for computer system data transfer.

2. Description of Background

In an SMP computer, such as the IBM® z Series® of mainframe computer systems manufactured by IBM, it is vitally important to maintain high levels or performance and interlocking. Many times, there are interfaces which are self-calibrating while others are timed to strict early/late timing criteria. However, self-calibrating logic can be costly in area. Asynchronous interfaces pose a problem as well due to extra handshaking signals that often cross between one side of the interface and another.

Many applications have data or controls that need to be sent over the bus asynchronously, where latency is not a big concern. Typically, metastability latches are added to help resolve possible transitions on signals. There is typically one control signal that is used for handshaking in one direction of the bus transfer. This signal is used to edge-trigger a sampling event. It is important that the data bus is stable before this signal is activated. Care must be taken to make sure that this control signal has more latency than the data bus. If not, the sampling could take place while the normal data bus is still transitioning.

While prior art techniques solve some of the problems that arise on asynchronous interfaces, there is a restriction that the control signal is separate from the data. Attempts to use the data bus to sample the data itself on an asynchronous interface can pose incorrect data samples due to not all the data bits being consistent on every cycle.

SUMMARY OF THE INVENTION

The data transfer interface in accordance with our invention and the described embodiments does not require a separate control signal. We have provided a mechanism wherein the data itself is used for determining if the data has changed. The invention provides stabilization logic which keeps the output data from transitioning through incorrect or illegal states prior to reaching the new steady-state The invention also allows for a programmable delay for the stability window to allow for unforeseen skews and noise that are experienced.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, for asynchronous or untimed interfaces where data is stable and transitions to another stable state, there is no need for a separate control signal for the interface. This can save valuable wires, especially between chips or other circuits. Also, the latency can be bound by the data skew, so if data skew is less, the latency can be designed less for that. The invention allows for a programmable latency to allow late trade-offs between risk of corruption and latency/performance without redesign.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
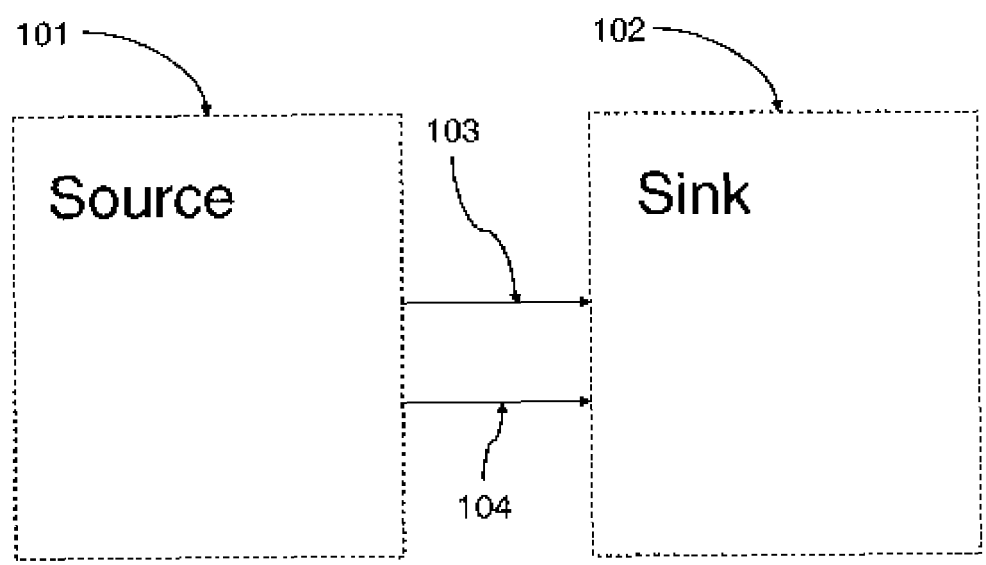
FIG. 1 illustrates an example of Prior An communication from a source to a sink.

Turning now to the drawings in greater detail, it will be seen that the prior art shown in FIG. 1 contains two circuits that communicate with each other. Shown is a single-direction of the communication. Data bus, 104, is driven by source circuit, 101, and received by sink circuit, 102. There is also a control signal, 103, that is sent from source circuit, 101, to sink circuit, 102. Typically, the data bus, 104, will be allowed to switch and will stabilize on a new value. Then, control signal, 103, will be used to activate a strobe to sample the stable data.

Figure 2:
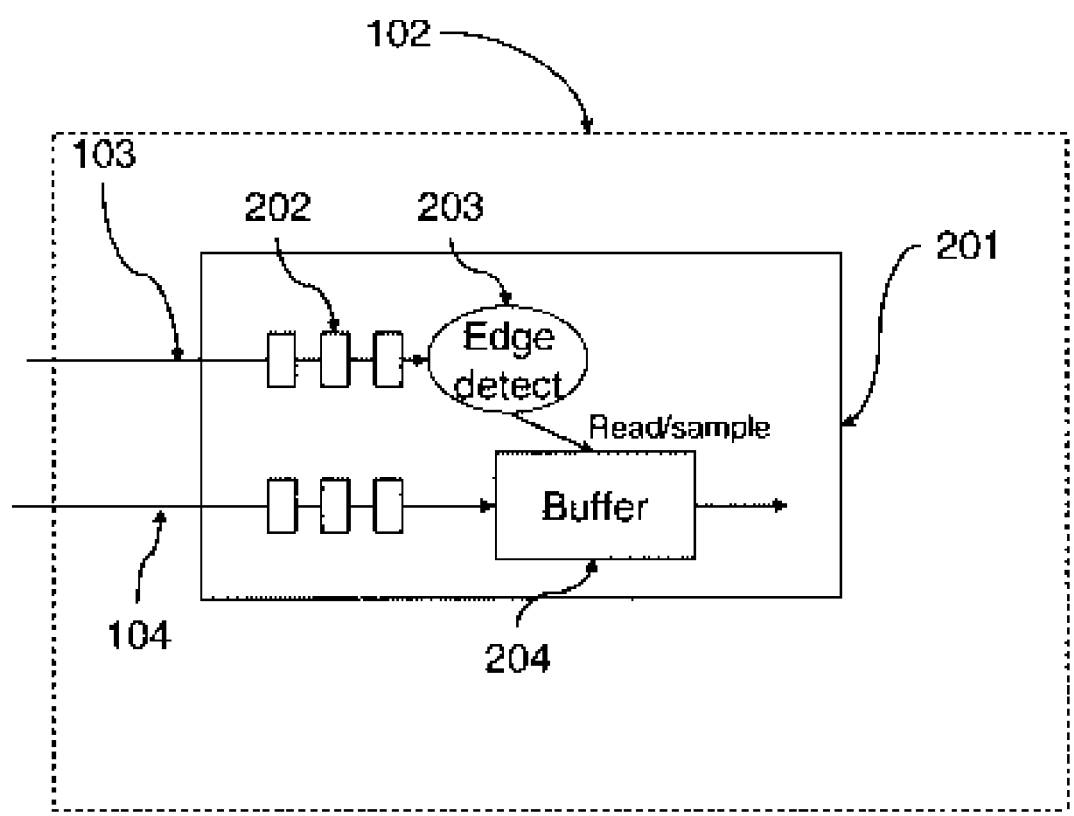
FIG. 2 illustrates an example of Prior Art asynchronous receiver circuitry.

FIG. 2 shows a more detailed diagram of prior art sink logic, 102. In this embodiment, control signal, 103, and data bus, 104, enter asynchronous receiver circuit, 201. Shown are metastability latches, 202, edge detect circuitry, 203, and staging register or buffer, 204. There are numerous other embodiments for implementing the prior art.

Figure 3:
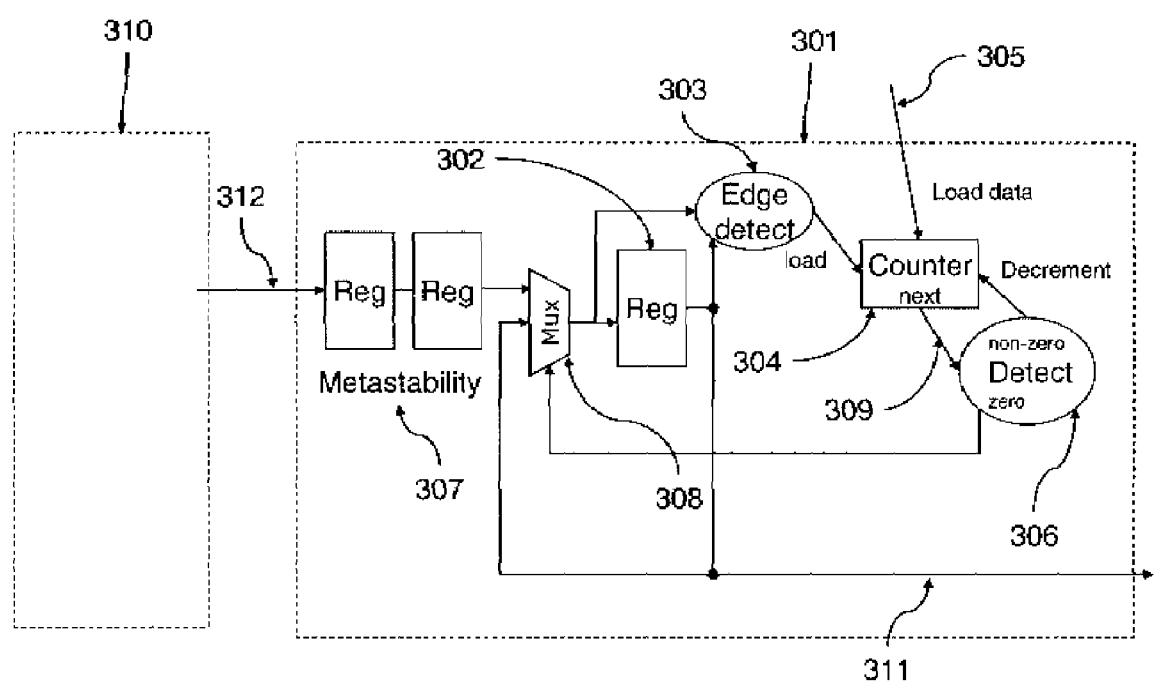
FIG. 3 illustrates an example of a data transfer method incorporating the invention.

FIG. 3 depicts the preferred embodiment of a data transfer method utilizing the invention. Unlike the prior art, there is no control signal, 103, between source circuit, 310, and sink circuit, 301. Instead, the data bus, 312, is used directly in the means to detect the data transition. Data bus, 312, gets staged through metastability registers, 307. This is to ensure that the data is consistent for downstream processing. There is a stability mux, 308, that allows new data to feed stability register, 302, that normally captures the data every cycle. The output of the stability register is compared to input of stability register using edge detect circuit, 303. When there is a miscompare in the new and old data bus values, the detect circuit, 303, loads a stability window counter, 304, with stability window duration value bus, 305.

The predicted next counter state is available at the output of the stability window counter, 304, on next counter state bus, 309. Next counter state bus, 309, feeds the counter detect circuit, 306, which determines if the next count will be zero or not. On the same cycle the counter is loaded with the stability window duration value bus, 305, the next counter state bus, 309, is non-zero. This forces the stability mux, 308, to re-load the stability register, 302, with its previous value rather than allowing the new data to enter the register. This causes the stability register, 302, to freeze its state. The only way the register can be reloaded with bus data is for the counter to reach zero.

Meanwhile, the counter detect circuit, 306, detects nonzero counter values and will decrement the stability window counter, 304, until it eventually reaches zero.

The output of the stability register, 302, is available to downstream logic as sink circuit stable output data bus, 311. Because the stability register, 302, is controlled to wait before sampling data that is transitioning, sink circuit stable output data bus, 311, is also stable.

Figure 4:
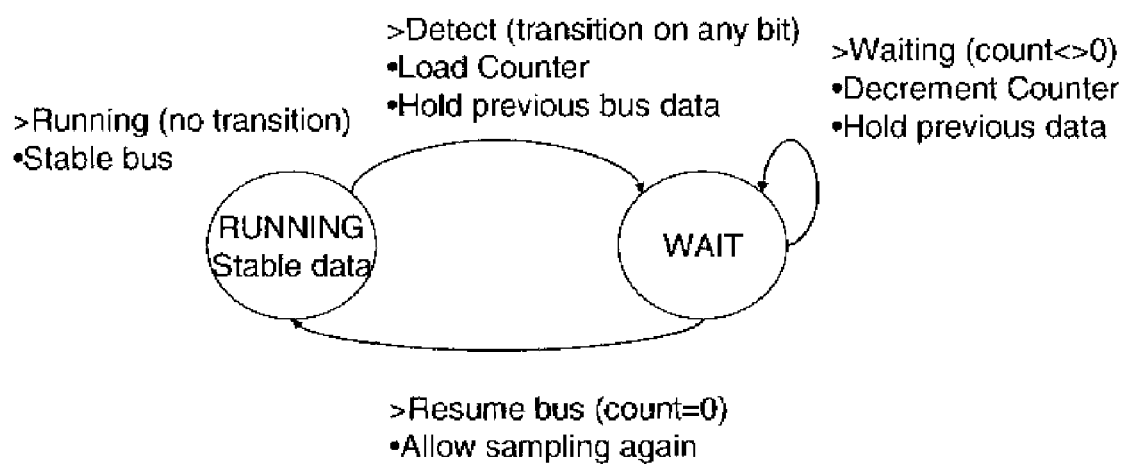
FIG. 4 illustrates a state diagram depicting a stabilization technique featured in the invention.

FIG. 4 shows a state diagram representing a method of the invention. The system starts in the RUNNING state where stable data is available. When a transition of any bit in the incoming data is detected, the previous data is held as output. This transition also causes a state change to the WAIT state. The invention will WAIT a predefined period of time. Typically this is similar to a loaded and decrementing counter. While in the WAIT state, output data is still being held at the previous state. When the WAIT period is over (e.g. count=0), there is a transition back to the RUNNING state. The new data is then sent as output. The invention relies on the fact that the WAIT period is at least as long as the maximum instability window of the data. Also, the data should not be allowed to switch again for at least a cycle after the guaranteed WAIT period. Given that there is uncertainty in the timing, the recommendation is to ensure that at least three maximum WAIT periods occur before sending new data from the source.

Figures 5, 6:
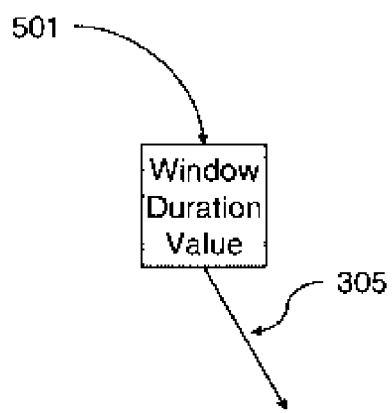
FIG. 5 illustrates an example of a programmable stability window duration value using a register.
FIG. 6 is a table depicting an example data bus stream and the results with and without the invention.

FIG. 5 shows one implementation of a preferred way to supply the stability window duration value bus, 305, using stability window duration programmable register, 501. This register can be loaded or changed based on many techniques known by those skilled in the art.

FIG. 6 shows a table comparing incoming raw data to outgoing data with and without the invention. Notice the illegal states encountered when not using the invention which are never intended to be sent on the original data bus. For instance, the source circuit data bus only drives the patterns 00000, 00FF00, and 000FF. Without the invention, the additional data patterns 0A000, 0E800, 00331, and 001FA may all show up as shown in this particular example. They represent the skew and/or noise that may be associated with data bits arriving at different times. However, with the invention, only the 00000, 00FF00, and 000FF are observed at the output.

While the figures and details describe a single-data bus, unidirectional, asynchronous interface, one skilled in the art can extend this concept to a multiple-bus, bi-directional (along with acknowledgment protocols), interface or system. Also, while a counter was shown in the invention, other means of delaying the stability period can be constructed. While the description showed the case where the stability register is normally unlocked and allows stable data to stream through and then locks into a stability window, the invention can be constructed such that data is normally blocked from the stability window and only gets gated into the stability register when there is stable data. Consideration would need to be given to the start-up values of the held data under these conditions. Many equivalent circuits and methods can certainly be applied.

The drawings indicate particular circuit implementations, but could also represent emulation of the same without departing from the spirit of the invention.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a different order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer system apparatus for data transfer comprising:
   a source circuit which launches data onto a data bus;
   a sink circuit which captures data from said data bus including meta-stablility register and stability registers, data change detection logic and a stability window delay counter and a multiplexor register pair are provided for holding previous data during transfer and wherein said sink circuit—s meta-stability registers stage the input data bus, and a stability register holds previous data from said data bus coupled onto a sink circuit output data bus, and
   wherein a multiplexor selects between the output of a last of said stability registers and an output of said stability register which holds previous data from said data bus coupled onto a sink circuit output data bus.

2. The apparatus according to claim 1 including a stability counter with a load input control, a load input value bus, and a decrement increment control.

3. The apparatus according to claim 2 further including an edge detect circuit which compares input and output buses of said stability register to determine if a change in data has occurred which also activates said load input of said stability counter thereto.

4. The apparatus according to claim 3 further including a counter detect circuit which decrements the counter when it has a nonzero value and which also controls said multiplexor to freeze said stability register at its present value when the counter is not zero.

5. The apparatus in accordance with claim 4 wherein said stability counter will decrement when the load and the decrement inputs are activated simultaneously.

6. The apparatus in accordance with claim 1 including a programmable register coupled to said stability register circuit.

7. The apparatus in accordance with claim 1 wherein said apparatus stabilizes one or more data bus signals across an asynchronous or untimed interface of said computer system without the use of a separate control signal for computer system data transfer.

* * * * *